US006754884B1

(12) United States Patent
Lucas et al.

(10) Patent No.: US 6,754,884 B1
(45) Date of Patent: Jun. 22, 2004

(54) PROGRAMMING LANGUAGE EXTENSIONS FOR PROCESSING XML OBJECTS AND RELATED APPLICATIONS

(75) Inventors: Terry L. Lucas, Mill Creek, WA (US); Adam Bosworth, Mercer Island, WA (US); Kenneth Eric Vasilik, Redmond, WA (US)

(73) Assignee: BEA Systems, Inc., San Jose, CA (US)

( * ) Notice: Subject to any disclaimer, the term of this patent is extended or adjusted under 35 U.S.C. 154(b) by 532 days.

(21) Appl. No.: 09/898,898

(22) Filed: Jul. 2, 2001

(51) Int. Cl.$^7$ ............................................... G06F 9/44
(52) U.S. Cl. ........................ 717/108; 717/115; 717/116
(58) Field of Search ................................ 717/108, 106, 717/107, 109, 114–118; 715/501.1, 513

(56) References Cited

U.S. PATENT DOCUMENTS

| | | | |
|---|---|---|---|
| 5,812,768 A | 9/1998 | Page et al. | 709/228 |
| 5,970,490 A | 10/1999 | Morgenstern | 707/10 |
| 6,070,184 A | 5/2000 | Blount et al. | 709/200 |
| 6,209,018 B1 | 3/2001 | Ben-Shachar et al. | 718/105 |
| 6,226,675 B1 | 5/2001 | Meltzer et al. | 709/223 |
| 6,230,160 B1 | 5/2001 | Chan et al. | 707/103 X |
| 6,253,252 B1 | 6/2001 | Schofield | 719/315 |
| 6,314,429 B1 | 11/2001 | Simser | 703/103 R |
| 6,404,445 B1 | 6/2002 | Galea et al. | 345/853 |
| 6,427,228 B1 * | 7/2002 | Wigger | 717/111 |
| 6,449,620 B1 | 9/2002 | Draper et al. | 707/102 |
| 6,490,564 B1 * | 12/2002 | Dodrill et al. | 704/275 |
| 6,578,192 B1 * | 6/2003 | Boehme et al. | 717/115 |
| 6,594,823 B1 * | 7/2003 | Corbin et al. | 717/143 |
| 2001/0029604 A1 | 10/2001 | Dreyband et al. | 717/108 |
| 2001/0047385 A1 | 11/2001 | Tuatini | 709/203 |
| 2002/0073236 A1 | 6/2002 | Helgeson et al. | 709/228 |
| 2002/0099738 A1 | 7/2002 | Grant | 707/513 |
| 2002/0184264 A1 | 12/2002 | Berg et al. | 707/10 |

OTHER PUBLICATIONS

Golden. U.S. patent application Publicaiton. US 2002/0073399.*
Dietrich et al. A Reusable Graphical User Interface for Manipulating Object–Oriented Databases Using Java and XML. ACM. 2001. pp. 362–366.*
Leslie. Using Javadoc and XML to Produce API Reference Documentation. ACM. 2002. pp. 104–109.*
Shinagawa et al. Extension Mechanism in Extensible XML Query Language XQL. IEEE. 2002. pp. 183–192.*
Banbara et al., "Translating a Linear Logic Programming Language into Java," Electronic Notes in Theoretical Computer Science, 1999, pp. 1–15.
Ha et al., "Mapping XML Documents to the Object–Relational Form," IEEE, Jun. 12 ,2001, pp. 1757–1761.
Suzuki et al., "Managing the Software Design documents with XML," ACM, 1998, pp. 127–136.

(List continued on next page.)

*Primary Examiner*—Wei Zhen
(74) *Attorney, Agent, or Firm*—Schwabe, Williamson & Wyatt, P.C.

(57) ABSTRACT

An apparatus is provided to map data objects of a data representation language to corresponding objects within a programming language and vice versa. In one embodiment, the apparatus is equipped to receive a mapping definition mapping selected elements of an XML data structure to selected objects of one or more Java classes. The apparatus is further equipped to determine whether the mapping definition comprises one or more definitional statements expressed with XML oriented language elements of a script language. Further, the apparatus is equipped to process the mapping definition statements comprising XML oriented language elements of the script language, in accordance with syntactical and semantic definitions of the XML oriented language elements.

51 Claims, 12 Drawing Sheets

OTHER PUBLICATIONS

Wallace et al., "Haskell and XML: Generic Combinations or Type–Based Translation?" ACM, 1999, pp. 148–159.

Banbara et al., "Translating A Linear Logic Programming Language into Java," Electronic Notes in Theoretical Computer Science (1999), pp. 1–15.

Binding et al., "Generation of Java Beans to Access XML Data," Proceedings of the first International Conference on Web Information Systems Engineering, Jun. 2000, vol. 2, pp. 143–149.

Chandramouli, R., "Application of XML Tools for Enterprise–Wide RBAC Implementation Tasks," Proceedings of the 5$^{th}$ ACM Workshop on Role–based Access Control, Jul. 2000, pp. 11–18.

Imamura et al., "Mapping Between ASN.1 and XML," Jan. 2001, Proceedings of the 2001 Symposium on Applications and the Internet, pp. 57–64.

Rundensteiner et al., "Maintaining Data Warehouses Over Changing Information Sources," Communications of the ACM, Jun. 2000, vol. 43, No. 6, pp. 57–62.

Sahuguet et al., "Looking at the Web Through XML Glasses," Proceedings of the 1999 IFCIS International Conference on Cooperative Information Systems, Sep. 1999, pp. 148–159.

Wallace et al., "Haskell and XML: Generic Combinators or Type–Based Translation?" (1999) ACM, pp. 148–159.

Zwol et al., "The Webspace Method: On The Integration of Database Technology with Multimedia Retrieval," Proceedings of the 9$^{th}$ International Conference on Information and Knowledge.

Management, Nov. 2000, pp. 438–445.

* cited by examiner

```
300  (A) int i;       // an integer variable
     (B) float f;     // a floating point variable
     (C) XML x;       // an XML variable
     (D) XML y;       // another XML variable 310  (A) XML p = <person><name>John</name><age>25</age></person>;
     (B) e = <employees>
     (C)       <employee id="1"><name>Joe</name><age>20</age></employee>
     (D)       <employee id="2"><name>Sue</name><age>30</age></employee>
     (E)     </employees>;

320  (A) for (i = 0; i < 10; i++)
     (B)   e[i] = <employee id={i}>                              // compute id value
     (C)           <name>{names[i].toUpperCase()}</name>         // compute name value
     (D)           <age>{ages[i]}</age>                          // compute age value
     (E)         </employee>
```

FIG. 3A

330
- (A) XML John = "<employee><name>John</name><age>25</age></employee>";
- (B) XML Sue="<employee><name>Sue</name><age>32</age></employee>";
- (C) String tagName = "employees";
- (D) XML employees = "<"+ tagName +">" + John + Sue + "</"+ tagName +">";
- (E) XML employees = <employees>{John + Sue}</employees>;

340
- (A) XML e = <employee id="1"><name>John</name><age>25</age></employee>;
- (B) String name = e.employee.name;                    // get the name of the employee
- (C) e.employee.name = "Fred";                         // set the name of the employee
- (D) XML ref = e.employee;                             // returns a reference to the <employee> element 350
- (A) int empid = e.employees.employee[1].@id;          // get the id attribute of the employee
- (B) e.employees.employee[3].@id = 10;                 // set the id attribute of the employee 360
- (A) e = <employees>
- (B)     <employee id="1"><name>Joe</name><age>20</age></employee>
- (C)     <employee id="2"><name>Sue</name><age>30</age></employee>
- (D) </employees>;

- (E) names = e..name;                                  // get all the names in e

FIG. 3B 370
(A) e = <employees>
(B)    <employee id="0"><name>Joe</name><age>20</age></employee>
(C)    <employee id="1"><name>Sue</name><age>30</age></employee>
(D) </employees>;

(E) suesAge = e.employees.employee[1].age;  // get Sue's age
(F) e.employees.employee[1].name = "Fred";  // Change Sue's name to Fred 380
(A) For (n in e..name) {    // print out all the names in e
(B)    Print ("Employee name: " + n) };

(C) For (i = 0; i < e..name.length; i++) {
(D)    print("Employee name:" + e..name[i]);}

FIG. 3C

```
Function FromXML(XML availableat, Point[] points) { int i = 0;
  points = new Point[availableat..address.length()];      // one point for each address // for each address, compute the display label and point location
  for (a in availableat..address) {
                                        // The label is 3 lines long
    points[i].label = a.parent().name + '\n'  // line 1: store name
      + a.street + '\n'                       // line 2: street address
      + a.city + ', ' + a.state + ', ' + a.zip;   // line 3: city, state, zip // compute map location from the address
    points[i].location = new LatitudeLongitude(a.street, a.city, a.state, a.zip);
    i++;
  }
}
```

```
Function ToXML(Point[] points, XML availableat) {

// build the root node
525 availableat = <available-at></available-at>;

// for each point, add a store element
530 for (p in points) {
        lines = p.label.split("\n");              // split the label up into its 3 lines
        citystatezip = lines[2].split(", ");      // split line 3 into city, state, zip // append a store element representing this point
535 availableat.available-at.appendChild(
            <store>
                <name>{lines[0]}</name>           // line 1 is store name
                <address>
                    <street>{lines[1]}</street>   // line 2 is street addr
                    <city>{citystatezip[0]}</city>
                    <state>{citystatezip[1]}</state>
                    <zip>{citystatezip[2]}<zip>
                </address>
            </store>);
    }
}
```

FIG. 5B

```
import org.w3c.dom.*;
import org.apache.xerces.dom.*;

// class declarations omitted ...

public static void FromXML(Document availableat, Point[] points) {
        // one point for each address
        NodeList addresses = availableat.getElementsByTagName("address");
        points = new Point[addresses.getLength()];

// for each address, compute the display label and point location
        for (int i = 0; i < addresses.getLength(); i++) {
                // get the store name, street address, city, state and zip for each address
                Element a = (Element)addresses.item(i);
                Element store = (Element)a.getParentNode();
                Node name = store.getElementsByTagName("name").item(0);
                Node street = a.getElementsByTagName("street").item(0);
                Node city = a.getElementsByTagName("city").item(0);
                Node state = a.getElementsByTagName("state").item(0);
                Node zip = a.getElementsByTagName("zip").item(0);

// the label is three lines long
                points[i].label = name.getNodeValue() + '\n'      //line 1: store name
                                + street.getNodeValue() + '\n'    //line 2: street address
                                + city.getNodeValue() + ", "      //line 3: city
                                + state.getNodeValue() + ", "     //        state
                                + zip.getNodeValue();             //        zip // compute map location from the address
                points[i].location = new LatitudeLongitude(
                                street.getNodeValue(), city.getNodeValue(),
                                state.getNodeValue(), zip.getNodeValue());
        }
}
```

FIG. 7A
(PRIOR ART)

```
public static void ToXML(Point[] points, Document availableat) {
    // build the root node
    availableat = new DocumentImpl();
    Element root = availableat.createElement("available-at");

// for each point, add a store element
    for (int i = 0; i < points.length; i++) {
        // split the label up into its 3 lines
        String name = points[i].label.substring(0,
            points[i].label.indexOf('\n'));
        String street = points[i].label.substring(name.length()+1,
            points[i].label.indexOf('\n', name.length()+1));
        String citystatezip = points[i].label.substring(
            name.length()+street.length()+2);

// split line 3 into city, state and zip
        String city = citystatezip.substring(0,
            citystatezip.indexOf(", "));
        String state = citystatezip.substring(city.length()+2,
            citystatezip.indexOf(", ", city.length()+2));
        String zip = citystatezip.substring(
            city.length()+state.length()+4);

// create Text Nodes for the store name, street addres, city, state and zip
        Text nameText = availableat.createTextNode(name);
        Text streetText = availableat.createTextNode(street);
        Text cityText = availableat.createTextNode(city);
        Text stateText = availableat.createTextNode(state);
        Text zipText = availableat.createTextNode(zip);

// create elements to hold the text nodes
        Element ename = availableat.createElement("name");
        Element eaddress = availableat.createElement("address");
        Element estreet = availableat.createElement("street");
        Element ecity = availableat.createElement("city");
        Element estate = availableat.createElement("state");
        Element ezip = availableat.createElement("zip");

// attach the text nodes to their associated elements
        ename.appendChild(nameText);
        estreet.appendChild(streetText);
        ecity.appendChild(cityText);
        estate.appendChild(stateText);
        ezip.appendChild(zipText);
```

FIG. 7B
(PRIOR ART)

```
            // build the address element content
            eaddress.appendChild(estreet);
            eaddress.appendChild(ecity);
            eaddress.appendChild(estate);
            eaddress.appendChild(ezip);

// create the store element, add it's associated name and address
            Element store = availableat.createElement("store");
            store.appendChild(ename);
            store.appendChild(eaddress);

// append a store element representing this point
            root.appendChild(store);
        }
}
```

FIG. 7C
(PRIOR ART)

PROGRAMMING LANGUAGE EXTENSIONS FOR PROCESSING XML OBJECTS AND RELATED APPLICATIONS

BACKGROUND OF THE INVENTION

1. Field of the Invention

The present invention relates to the field of programming languages. More specifically, the present invention relates to a method for manipulating XML-centric objects in a native programming language environment.

2. Background Information

XML is rapidly emerging as the de-facto standard for transmitting data structures between software applications and web services. While most software applications and web services are written in modern programming languages, such as Java or C++, none of these programming languages provide native support for representing and manipulating XML. Consequently, programmers are forced to develop or adopt external software packages for representing and manipulating XML within the context of their applications and web services.

In general, external software packages are not capable of providing the host language with native support for processing XML data. As such, they represent and manipulate XML in ways that are quite different than those provided by the host language for its native data types. Most often, external software packages represent XML data using a general purpose tree abstraction and provide a tree-based API for navigating and manipulating the data (e.g., getParentNode( ), getChildNodes( ), removeChild( ), etc.). This method of accessing and manipulating data structures is cumbersome and time consuming compared to methods used for accessing and manipulating data structures native to the host programming language.

Therefore, a programming language that enables the manipulation of XML data structures with the same power and flexibility afforded native data structures is desirable.

BRIEF DESCRIPTION OF DRAWINGS

The present invention will be described by way of exemplary embodiments, but not limitations, illustrated in the accompanying drawings in which like references denote similar elements, and in which:

FIGS. 3A–3C illustrate various exemplary language extensions in accordance with one embodiment of the present invention;

FIGS. 5A–5B illustrate example functions incorporating language extensions of the present invention for mapping XML documents to Java objects and Java objects to XML documents, in accordance with one embodiment;

FIGS. 7A–C illustrate example functions based upon the prior art, for mapping XML documents to Java objects and Java objects to XML documents.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a processor based device, using terms such as receiving, analyzing, determining, generating, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor include microprocessors, micro-controllers, digital signal processors, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Overview

The present invention includes the provision of functional descriptions in the form of programming language extensions to facilitate flexible manipulation of XML objects in a native programming environment. The language extensions include a native XML data type and a collection of operations that enable programmers to navigate and manipulate XML objects in much the same way native language objects are navigated and manipulated. Accordingly, the present invention provides a mechanism for manipulating both XML and native language objects, that is particularly well suited for the increasingly ubiquitous problem of mapping XML objects into and out of software applications and web services written in modern programming languages.

Figure 1:
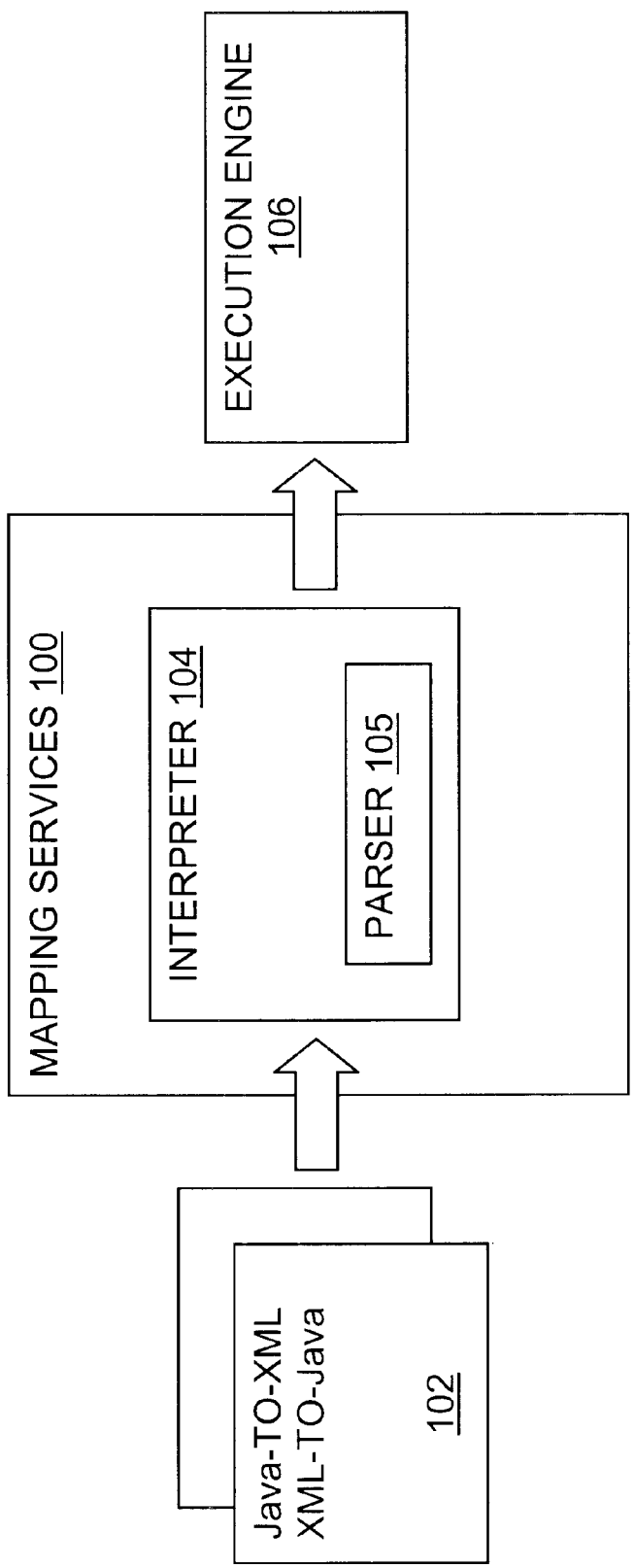
FIG. 1 illustrates an overview of one embodiment of the present invention.

FIG. 1 illustrates an overview of the present invention, in accordance with one embodiment. As shown, mapping services 100 include interpreter/compiler 104 ("interpreter"), which further contains parser 105. In accordance with the teachings of the present invention, programming statements 102 including various language extensions, are provided to mapping services 100 to be parsed by parser 105. Once the statements are parsed, interpreter 104 compiles the statements into executable code, which is then provided to execution engine 106. Execution engine 106 controls execution of the code (by e.g. a processor) as well as performs conventional execution runtime services, such as memory allocation request and release, error/exception handling, and so forth.

For the illustrated embodiment, interpreter 104 includes an application programming interface (API) (not shown), through which programming statements formed using language extensions of the present invention, may be programmatically submitted for compilation by a variety of application-specific processes. For example, a web server application may make calls to mapping services 100 upon the receipt of XML documents in order to map the XML document objects as e.g., internal Java classes for additional processing by the web server. Such application-specific processes may be co-resident with mapping services 100 on the same "host" system (not shown) as mapping services 100, or remotely disposed away from the "host" system and communicate with mapping services 100 using conventional cross system communication techniques.

Figure 2:
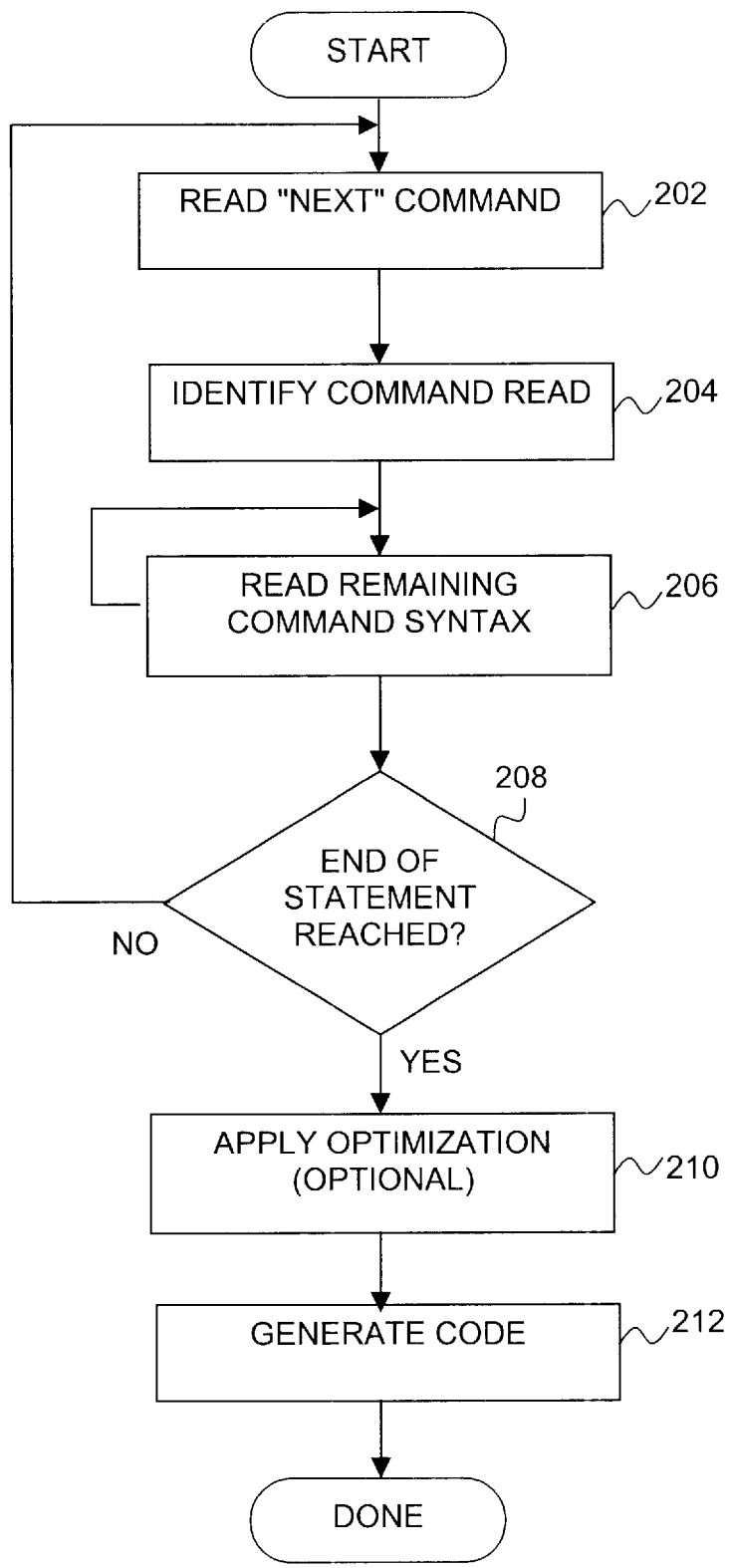
FIG. 2 illustrates an exemplary operational flow of interpreter 104, in accordance with one embodiment of the invention.

FIG. 2 illustrates an exemplary operational flow of interpreter 104 in accordance with one embodiment of the invention. In operation, interpreter 104 reads a first command of a statement being compiled. As illustrated, upon invocation, at block 202, interpreter 104 locates the "next" command of the statement being compiled. Locating the "next" command of the statement being compiled may be effectuated using any one of a number of "parsing" techniques known in the art. Upon locating the "next" command of the statement being compiled, at block 204, interpreter 104 identifies the command read (e.g. from a language dictionary maintained by interpreter 104). Next, at block 206, interpreter 104 reads the rest of the command syntax, and determines the semantic for the identified command.

At block 208, interpreter 104 determines if the end of the statement has been reached. If not, interpreter 104 returns to block 202, and continues the compilation process from there. Eventually the end of the statement being compiled is reached, and at such time, interpreter 104 may optionally apply one or more optimizations to the commands analyzed, block 210. The optimizations may be any one or more of the applicable compiler optimization techniques known in the art.

Finally, with or without optimizing the commands analyzed, at block 212, interpreter 104 generates executable code for the commands analyzed. In one embodiment, interpreter 104 generates byte codes for the commands analyzed. In alternate embodiments, other equivalent "code generation" approaches may be practiced instead.

Language Mapping Extensions

Programming languages do not provide sufficient functionality when it comes to interoperability and translation between XML documents and programming language objects. Therefore, in accordance with the teachings of the present invention, XML-oriented language extensions for use in association with a scripting language, such as Javascript, ECMAScript, and so forth, are provided and will now be described. Although the following language extensions are described in relation to Javascript, the applicability of the present invention should not be read as being limited solely to Javascript.

FIGS. 3A–3C illustrate various exemplary Javascript language extensions of the present invention, in accordance with one embodiment. First, language extension 300 illustrates an XML (data) type declaration explicitly indicating that a given variable (e.g. x,y) is associated with an XML class of variables. As illustrated, such XML variables may be declared just as any native Javascript data type may be declared. In one embodiment, a Javascript-aware parser (e.g. parser 105) is equipped to recognize XML data type declarations and associate them with the appropriate items in the corresponding symbol table (e.g., variables, function parameters, function return values, etc.). Interpreter 104 uses this type of information to determine the semantics of operations performed on values of type XML, and for example, to decide when to implicitly coerce values to or from-the XML type (described more fully below). In the illustrated embodiment, the XML type is declared by way of a self-identifying prefix (e.g., 'XML').

Language extension 310 illustrates an assignment made between a structured expression including XML syntax and an XML-typed variable. For example, in line 310(A) an XML-typed variable "p" is assigned an XML structure representing a person element including name (e.g. John) and age (e.g. 25) elements. Although the expression in line 310(A) includes an explicit XML-type indicator (as described above), in accordance with one embodiment of the invention, variables initialized using expressions containing XML syntax do not require such explicit XML-type declarations. In one embodiment, the "<" symbol, which is used in all XML tag definitions, is further utilized in the present invention as a unary operator to indicate to the interpreter that the expression to follow is to be treated as a string, and parsed as an XML statement. In one embodiment, the operand of the "<" operator is the entire XML literal up to and including the end tag. Accordingly, since the unary operator "<" triggers a result in a value of type XML, it is not necessary for variables being assigned XML literals to be explicitly declared as type XML. For example, lines 310(B)–(E) illustrate an XML-type variable "e" that has been implicitly declared based upon the content of the expression.

Language extension 320 illustrates that, in accordance with the teachings of the present invention, portions of an XML literal can be determined dynamically through the use of embedded expressions. In the illustrated embodiment, the mapping services of the present invention dynamically resolve portions of XML literals containing embedded Javascript expressions. In one embodiment, interpreter 104 is equipped to recognize a set of curly braces (e.g., "{. . . }") as an embedded expression operator having higher precedence than the unary operator "<" (described above). However, it should be noted that operators other than "{ }" may be utilized as an embedded expression operator without departing from the spirit and scope of the invention. In any event, if parser 105 identifies that the embedded expression operator is present within an expression, the operand enclosed within the operator is passed to interpreter 104 for evaluation, with the resulting return value being coerced (described below) to type string. Thereafter, string concatenation is used to insert the return value between the preceding and following XML literals. Once all the embedded expressions have been evaluated and their results inserted within the XML literal, the presence of the "<" operator causes interpreter 104 to convert the resulting string to an XML type.

Language extension 330 illustrates the principle of type coercion practiced by interpreter 104. In accordance with one embodiment of the invention, any value of type string that occurs where parser 105 expects a value of type XML is automatically converted to the XML data type by parsing the contents of the string as XML. Prior to the conversion, the string value can be constructed and manipulated using string arithmetic without regard for XML constraints such as well-formedness. For example, in lines 330(A)–(D) of FIG. 3B, an XML type variable is assigned the result of multiple string concatenations. More specifically, the variable "tagName" of type string is concatenated with two other string values (e.g., "<" and ">")to form XML open and close tags. The resulting tags are again treated as strings and concatenated with the values of "john" and "Sue", which are also treated as strings notwithstanding the fact that they represent XML expressions. The resulting string value is then coerced back into an XML value due to the explicit "XML" data type declaration. Additionally, string values are also automatically coerced into XML values in other contexts where XML is expected. For example, string values passed to functions expecting XML parameters and string values embedded within XML literals will similarly be converted into XML. Accordingly, line 330(E) yields the same result as line 330(D).

Language extensions 340 illustrate the principal that once a variable contains an XML value, the child elements of the XML variable may be accessed and/or assigned using a predefined operator such as, but not limited to a period/dot (".") (hereinafter "dot operator"). The dot operator examines all of the child elements of its left operand and returns in order, those elements with names that match the right operand. This may result in zero or more elements being returned. In one embodiment, if the designated child element is a leaf node, then the content of the child element is returned. However, if the designated child element is not a leaf node, then the designated child element complete with all of its descendants is returned (see e.g. 340(D)). Additionally, it is possible for the left operand of a dot operator to be a list of elements instead of a single element (e.g., consider when two or more dots are used in succession). In this case, the dot operator iterates over the list examining the children of each element in order. This treatment intentionally blurs the distinction between a single element and lists of elements to simplify the programmer's task.

Language extension 350, illustrates that attributes of an XML element may be accessed and assigned using an "attribute" operator. In one embodiment, the attribute operator is represented by the '.@' symbol. The attribute operator examines all of the attributes of its left operand and returns the value of the one whose name matches its right operand. For example, in line 350(A), the value associated with the 'id' attribute for one of at least two employees is retrieved and assigned to an 'empid' variable of type integer.

In addition to providing direct access to the immediate child elements of an XML value, the language extensions of the present invention provide direct access to all descendents (i.e., children, grandchildren, great grandchildren, etc.) of an XML value (see e.g., language element 330). In one embodiment the "double dot" (e.g. '..') operator examines all of the descendent elements of its left operand and returns those with names that match its right operand in document order. When the left operand is a list of elements, the ".." operator iterates over the list examining the descendents of each element in order.

Language extension 370 illustrates an indexing property of the present invention, whereby given a list of child elements, a predefined indexing operator may be utilized to identify an individual child element within the list. In one embodiment, a set of square brackets "[ ]" is used as the indexing operator. The indexing operator essentially selects a single element from its left operand based on its ordinal position within the list. The left operand may represent a list of elements, or a single element. In the event the operand represents a single element, it will be treated as a list having a size equal to one.

The present invention also provides for iterating over lists of child elements as illustrated by language element 380. In the illustrated example, the expression "e..name" returns a list of elements, and the "for" statement steps through the list in order. For each element in the list, the "for" statement assigns the variable "n" to the element and executes the code nested in the curly braces. Alternatively, the length of a list of child elements may be determined using the same methods available in the host programming language to determine the length of an array. For example, in the statement on line 380(C)), the length of the list of child elements is determined by accessing the implicit "length" property (e.g., ".length") of the host ECMAScript language. Accordingly, lines 380(C)–(D) produce the same result as will be produced by lines 380(A)–(B).

Example Application

As alluded to above, the language extensions of the present invention are particularly well-suited for use in mapping objects from a data representation language to corresponding objects of a programming language, and vice versa. Such a language mapping may be desirable in situations where, for example, a system having an internal operating environment based upon a programming language such as Java, is required to exchange data with other systems using a data representation language such as XML.

Figure 4:
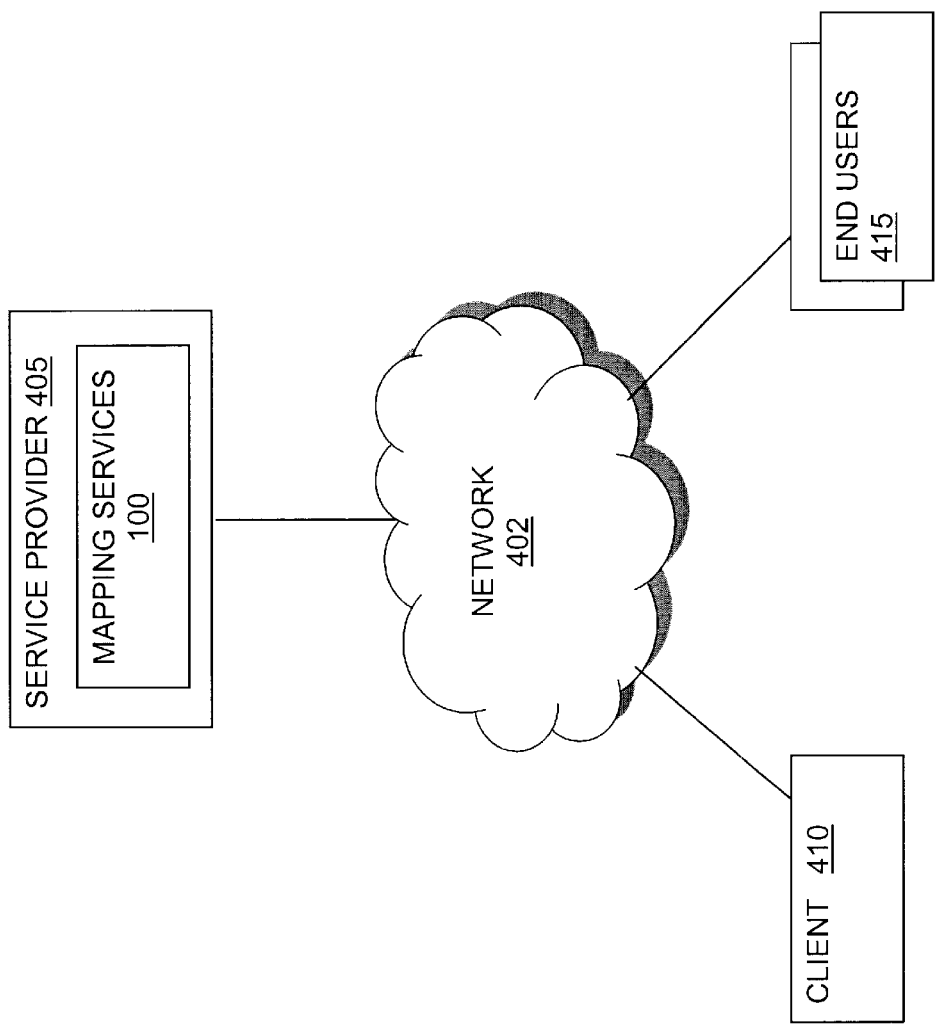
FIG. 4 is a block diagram illustrating one embodiment of a communication network suitable for use in practicing the present invention.

FIG. 4 is a block diagram illustrating an exemplary communication network incorporating the teachings of the present invention. As shown, service provider 405, client 110, and end users 415 are communicatively coupled together by network 402. Network 402 represents any of a number of communication networks such as one or more local area networks, wide area networks, the Internet, and so forth. Service provider 405 represents a "value added" service provider that provides content and/or services to client 410 and end users 415. Client 410 represents one or more entities that utilize the value added services of service provider 405 in order e.g., to provide improved content to end users 415 over network 402.

Assume, for example, that service provider 405 has developed a new web service for generating interactive geographic maps that highlight various points of interest on behalf of client 410. To take advantage of this service offered by service provider 405, client 410 transmits a list of points of interest to service provider 405 via network 402. In response, service provider 405 generates one or more interactive geographic maps, which display selectable representations of the points of interest provided by client 410. Service provider 405 then returns one or more URL(s) pointing to the geographic map(s) to client 410, which in turn utilizes the URL(s) to display the geographic map(s) to end users 415. Each time a geographic map is presented to end users 415 by client 410, end users 415 may select one or more of the points, which are then returned to service provider 405. Service provider 405 then transmits the selected points back to the client 410 for any further processing client 410 wishes to perform.

The nature of the processing client 410 may perform is determined by client 410 and depends e.g. upon the context in which the service provider's services are utilized. For example, client 410 may represent a real estate agency that uses the points to display demographic data and property locations to end users 415, a weather service that uses the points to graphically display temperatures and weather phenomenon the weather service has gathered, a product manufacturer that uses the points to graphically display store locations, and so forth.

Each such incarnation of client 410 may utilize their own pre-defined XML format for transmitting such points of interest. For example, the weather community may have agreed on a format for transmitting information about weather phenomenon, the real estate community may have agreed on a format for transmitting information about homes, and product manufactures may have agreed on a format for transmitting store locations. The following Example 1 shows an XML format used e.g. by the product manufacturing community for transmitting the locations of stores that carry their products. . . .

```
Example 1:    <available-at>
                <store>
                    <name>The Electronics Store</name>
                    <address>
                        <street>23 Transistor Dr.</street>
                        <city>Circuit</city>
                        <state>WA</state>
                        <zip>12345</zip>
                    </address>
                </store>
                <store> . . . </store>
                <store> . . . </store>
              </available-at>
```

Internally, however, service provider 405 represents points of interest as an array of points, each defined by the Java class shown below in Example 2. . . .

Example 2

```
public class Point {
    String label; //text to display next to point
    LatitudeLongitude location;//location of point on map
}
```

In order to make it easy for a broad range of client communities to access their service, service provider 405 would like to be able to accept data in a wide variety of XML formats (i.e. such as the one shown in Example 1), and then have that data automatically mapped into analogous data structures within the native programming language of service provider 405.

FIGS. 5A–5B illustrate example functions, incorporating language extensions of one embodiment of the present invention for mapping XML documents to Java objects and Java objects to XML documents, as described above with respect to FIG. 4. In the illustrated example, service provider 405 would call the "FromXML" function (as shown in FIG. 5A) each time it received an XML document from client 410 that needed to be converted into Java objects. Similarly, each time service provider 405 needed to translate internal java objects into XML for use by client 410, service provider 405 would call the "ToXML" function of FIG. 5B.

Reference is now drawn to FIG. 5A within which the "FromXML" function is illustrated. Assume a new client is in the process of transmitting location data to service provider 405 in the form of an XML document containing the structure shown in Example 1. Upon receiving the data, service provider 405 will initiate a function call to "FromXML". Among items to note within the function, statement 500 uses the "double dot" operator (described above), in addition to the ".length" instruction to navigate through the received XML structure and allocate one new point object for each XML address provided. Next, for each address provided in the XML data, a display label and point location are determined based upon the internal data constraints of service provider 405 (as shown in Example 2). In statement 505, the "availableat..address" returns a list of address elements, which in turn are iteratively assigned to the variable "a". Next, the name of each store is determined using the built-in parents function followed by the dot operator. In addition, the street address, city, state, and zip within which that store is located, is determined using the dot operator. As is illustrated by statements 510, strings returned by the direct access of descendent address elements are concatenated together to form the point label. Additionally, address information, including street, city, state, and zip information, is used in a LatitudeLongitude function (not shown) that computes a map location given an input address.

In FIG. 5B, a "ToXML" function is illustrated for use in converting Java based point locations into the XML elements shown in Example 1. To begin, the root node "<available-at>" is constructed by statement 525 using an XML literal. Next, statements 530 use a "String.split( )" function to parse the display label to determine a store name, street address, city, state and zip for each point. Finally, statements 535 create a store element for each point, which are appended to the root node from statement 525.

FIGS. 7AC illustrate example functions for mapping XML documents to Java objects and Java objects to XML documents, based upon conventional applications and techniques known in the prior art. As it can be readily seen, the amount and complexity of code required to implement the above-illustrated functions using Java and the standard XML Document Object Model (DOM) is substantial. However, in comparison, given the teachings of the present invention including the previously described language extensions, such an effort may be minimized considerably.

Example Host Computer System

Figure 6:
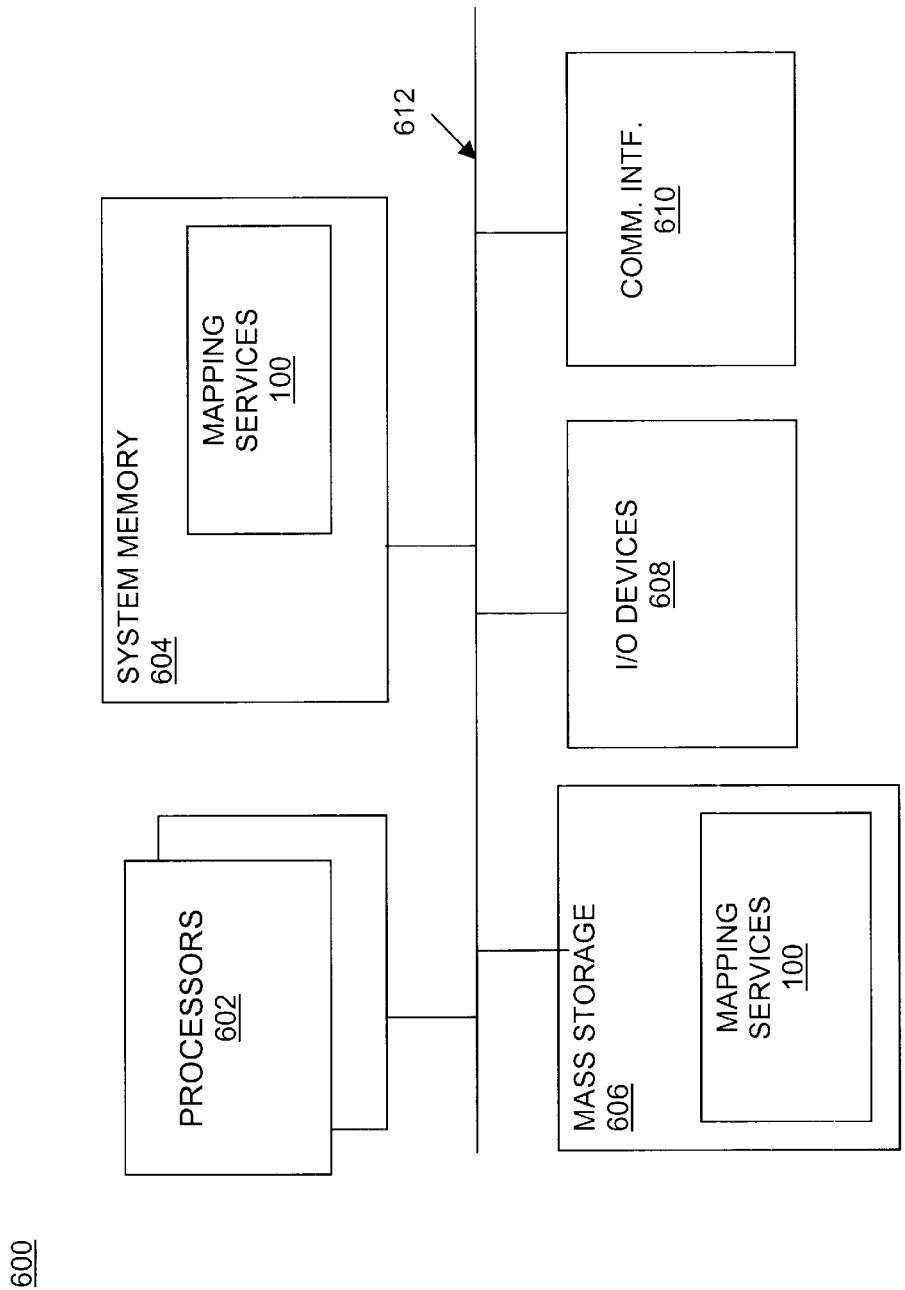
FIG. 6 illustrates an example computer system suitable for hosting the mapping services of the present invention including interpreter 104, in accordance with one embodiment.

FIG. 6 illustrates an example computer system suitable for hosting mapping services 100 and interpreter 104 of the present invention. As shown, computer system 600 includes one or more processors 602, and system memory 604. Additionally, computer system 600 includes mass storage devices 606 (such as diskette, hard drive, CDROM and so forth), input/output devices 608 (such as keyboard, cursor control and so forth) and communication interfaces 610 (such as network interface cards, modems and so forth). The elements are coupled to each other via system bus 612, which represents one or more buses. In the case of multiple buses, they are bridged by one or more bus bridges (not shown). Each of these elements performs its conventional functions known in the art. In particular, system memory 604 and mass storage 606 are employed to store a working copy and a permanent copy of the programming instructions implementing the interpreter and/or mapping services of the present invention. The permanent copy of the programming instructions may be loaded into mass storage 606 in the factory, or in the field, through e.g. a distribution medium (not shown) or through communication interface 610 (from a distribution server (not shown). The constitution of these elements 602–612 are known, and accordingly will not be further described.

Conclusion and Epilogue

Thus, it can be seen from the above descriptions, novel XML extensions to a script based language have been described. The novel scheme is particularly useful for mapping data objects between a programming language and a data representation language. While the present invention has been described referencing the illustrated and above enumerated embodiments, the present invention is not limited to these described embodiments. Numerous modifica-

What is claimed is:

1. A method comprising:
receiving a mapping definition mapping selected elements of a data representation language to selected objects of one or more programming languages;
determining whether the mapping definition comprises a mapping definition section having one or more definitional statements expressed with data representation oriented language elements of a script language that includes data representation oriented language elements; and
processing the mapping definition, including processing the mapping definition having mapping definition statements comprising data representation language elements of said script language in accordance with syntactical and semantic definitions of said data representation language elements.

2. An apparatus comprising:
a storage medium having stored therein a plurality of programming instructions, which when executed enables the apparatus to:
receive a mapping definition mapping selected elements of a data representation language to selected objects of one or more programming languages,
determine whether the mapping definition comprises a mapping definition section having one or more definitional statements expressed with data representation oriented language elements of a script language that includes data representation oriented language elements, and
process the mapping definition, including processing the mapping definition having mapping definition statements comprising data representation oriented language elements of said script language in accordance with syntactical and semantic definitions of said data representation oriented language elements; and
one or more processors coupled to the storage medium to execute the programming instructions.

3. A method comprising:
receiving a mapping definition mapping selected elements of an XML data structure to selected objects of one or more Java classes;
determining whether the mapping definition comprises one or more definitional statements expressed with language elements of a script language;
determining whether the one or more definitional statements comprise an assignment statement comprising a variable having an XML data type, and a data string to be assigned to the variable, if the mapping definition comprises one or more definitional statements expressed with language elements of a script language; and
processing the assignment statement, including processing the data string as an XML object, if it is determined that the one or more definitional statements comprise an assignment statement comprising a variable having an XML data type.

4. The method of claim 3, wherein said data string is implicitly identified as being associated with the XML data type based upon the structure of the data string.

5. The method of claim 4, wherein said data string is implicitly identified as being associated with the XML data type based upon the presence of a unary operator.

6. The method of claim 5, wherein the unary operator is represented by the "<" symbol.

7. The method of claim 4, wherein said data string is implicitly identified as being associated with the XML data type based upon the existence of one or more XML based literals in the data string.

8. The method of claim 3, wherein said data string is explicitly identified as being associated with the XML data type based upon the presence of an XML-identifying prefix.

9. The method of claim 8, wherein the identifying prefix is 'XML'.

10. An apparatus comprising:
a storage medium having stored therein a plurality of programming instructions, which when executed enables the apparatus to:
receive a mapping definition mapping selected elements of an XML data structure to selected objects of one or more Java classes, determine whether the mapping definition comprises one or more definitional statements expressed with language elements of a script language,
determine whether the one or more definitional statements comprise an assignment statement comprising a variable having an XML data type and a data string to be assigned to the variable, if the mapping definition comprises one or more definitional statements expressed with language elements of a script language, and
process the assignment statement, including processing the data string as an XML object, if it is determined that the one or more definitional statements comprise an assignment statement comprising a variable having an XML data type; and
one or more processors coupled to the storage medium to execute the programming instructions.

11. The apparatus of claim 10, wherein said data string is implicitly identified as being associated with the XML data type based upon the structure of the data string.

12. The apparatus of claim 11, wherein said data string is implicitly identified as being associated with the XML data type based upon the presence of a unary operator.

13. The apparatus of claim 11, wherein the unary operator is represented by the "<" symbol.

14. The apparatus of claim 11, wherein said data string is implicitly identified as being associated with the XML data type based upon the existence of one or more XML based literals in the data string.

15. The apparatus, of claim 10, wherein said data string is explicitly identified as being associated with the XML data type based upon the presence of an XML-identifying prefix.

16. The apparatus of claim 15, wherein the identifying prefix is 'XML'.

17. A method comprising:
receiving a mapping definition mapping selected elements of an XML data structure to selected objects of one or more Java classes;
determining whether the mapping definition comprises one or more definitional statements expressed with language elements of a script language;
determining whether the one or more definitional statements comprise an expression including an embedded expression, if the mapping definition comprises one or more definitional statements expressed with language elements of a script language;
dynamically resolving the value of the embedded expression, if the one or more definitional statements comprise an expression including an embedded expression; and processing the expression, including the resolved embedded function, as an XML data type.

18. The method of claim 17, wherein said embedded function is surrounded by a pair of predetermined identifiers.

19. The method of claim 18, wherein said pair of predetermined identifiers comprise a set of curly braces.

20. An apparatus comprising:
a storage medium having stored therein a plurality of programming instructions, which when executed enables the apparatus to:
receive a mapping definition mapping selected elements of an XML data structure to selected objects of one or more Java classes,
determine whether the mapping definition comprises one or more definitional statements expressed with language elements of a script language,
determine whether the one or more definitional statements comprise an expression including an embedded expression, if the mapping definition comprises one or more definitional statements expressed with language elements of a script language,
dynamically resolve the value of the embedded expression, if the one or more definitional statements comprise an expression including an embedded expression, and
process the expression, including the resolved embedded function, as an XML data type; and
one or more processors coupled to the storage medium to execute the programming instructions.

21. The apparatus of claim 20, wherein said embedded function is surrounded by a pair of predetermined identifiers.

22. The apparatus of claim 21, wherein said pair of predetermined identifiers comprise a set of curly braces.

23. A method comprising:
receiving a mapping definition mapping selected elements of an XML data structure to selected objects of one or more Java classes;
determining whether the mapping definition comprises one or more definitional statements expressed with language elements of a script language;
determining whether the one or more definitional statements comprise an expression including first and second elements of the XML data structure separated by a predefined navigational operator, if the mapping definition comprises one or more definitional statements expressed with language elements of a script language; and
processing the expression and returning one or more child elements of said first element having a name equivalent to that of said second element.

24. The method of claim 23, wherein said navigational operator comprises a period (".").

25. The method of claim 23, further comprising:
retrieving content associated with the one or more child elements and using at least part of said content in association with a second expression.

26. The method of claim 23, further comprising:
determining if any of said one or more child elements contain a second set of one or more child elements; and
returning the value associated with the second set of one or more child elements if it is determined that at least one of said one or more child elements contains a second set of one or more child elements.

27. The method of claim 23, wherein said expression further comprises a literal value, and wherein said accessed element is assigned the value.

28. An apparatus comprising:
a storage medium having stored therein a plurality of programming instructions, which when executed enables the apparatus to:
receive a mapping definition mapping selected elements of an XML data structure to selected objects of one or more Java classes,
determine whether the mapping definition comprises one or more definitional statements expressed with language elements of a script language,
determine whether the one or more definitional statements comprise an expression including first and second elements of the XML data structure separated by a predefined navigational operator, if the mapping definition comprises one or more definitional statements expressed with language elements of a script language, and
process the expression to access said second element of the XML data structure and return one or more child elements of said first element having a name equivalent to that of said second element; and
one or more processors coupled to the storage medium to execute the programming instructions.

29. The apparatus of claim 28, wherein said navigational operator comprises a period (".").

30. The apparatus of claim 28, further comprising instructions, which when executed, enable the apparatus to:
retrieve content associated with the one or more child elements and utilize at least part of said content in association with a second expression.

31. The apparatus of claim 28, further comprising instructions, which when executed, enable the apparatus to:
determine if any of said one or more child elements contain a second set of one or more child elements; and
return the value associated with the second set of one or more child elements if it is determined that at least one of said one or more child elements contains a second set of one or more child elements.

32. The apparatus of claim 28, wherein said expression further comprises a literal value, and wherein said accessed element is assigned the value.

33. A method comprising:
receiving a mapping definition mapping selected elements of an XML data structure to selected objects of one or more Java classes;
determining whether the mapping definition comprises one or more definitional statements expressed with language elements of a script language;
determining whether the one or more definitional statements comprise an expression including at least one element of the XML data structure associated with an attribute operator, if the mapping definition comprises one or more definitional statements expressed with language elements of a script language; and
accessing the value associated with an attribute identified by the attribute operator, if one or more definitional statements comprise an expression including at least one element of the XML data structure associated with the attribute operator.

34. The method of claim 33, wherein said expression further comprises a variable to be assigned the value of said attribute.

35. The method of claim 33, wherein said expression further comprises a literal value, and wherein said attribute is assigned the value.

36. The method of claim 33, wherein the attribute operator is '.@'.

37. An apparatus comprising:
a storage medium having stored therein a plurality of programming instructions, which when executed enables the apparatus to:
receive a mapping definition mapping selected elements of an XML data structure to selected objects of one or more Java classes,
determine whether the mapping definition comprises one or more definitional statements expressed with language elements of a script language,
determine whether the one or more definitional statements comprise an expression including at least one element of the XML data structure associated with an attribute operator, if the mapping definition comprises one or more definitional statements expressed with language elements of a script language, and
accessing the value associated with the attribute if one or more definitional statements comprise an expression including at least one element of the XML data structure associated with the attribute operator; and
one or more processors coupled to the storage medium to execute the programming instructions.

38. The apparatus of claim 37, wherein the attribute operator is '.@'.

39. A method comprising:
receiving a mapping definition mapping selected elements of an XML data structure to selected objects of one or more Java classes;
determining whether the mapping definition comprises one or more definitional statements expressed with language elements of a script language;
determining whether the one or more definitional statements comprise an expression including first and second elements of the XML data structure separated by a predefined navigational operator, if the mapping definition comprises one or more definitional statements expressed with language elements of a script language; and
processing the expression to access said second element of the XML data structure and all descendants of said second element.

40. The method of claim 39, wherein said navigational operator comprises at least two sequential periods ('..').

41. An apparatus comprising:
a storage medium having stored therein a plurality of programming instructions, which when executed enables the apparatus to:
receive a mapping definition mapping selected elements of an XML data structure to selected objects of one or more Java classes,
determine whether the mapping definition comprises one or more definitional statements expressed with language elements of a script language,
determine whether the one or more definitional statements comprise an expression including first and second elements of the XML data structure separated by a predefined navigational operator, if the mapping definition comprises one or more definitional statements expressed with language elements of a script language, and
process the expression to access said second element of the XML data structure and all descendants of said second element; and
one or more processors coupled to the storage medium to execute the programming instructions.

42. The apparatus of claim 41, wherein said navigational operator comprises at least two sequential periods ('..').

43. A method comprising:
receiving a mapping definition mapping selected elements of an XML data structure to selected objects of one or more Java classes;
determining whether the mapping definition comprises one or more definitional statements expressed with language elements of a script language;
determining whether the one or more definitional statements comprise an expression including an indexing operator defining a left operand and an index value, if the mapping definition comprises one or more definitional statements expressed with language elements of a script language; and
processing the expression to access a single element of the XML data structure having an ordinal position equivalent to the index value.

44. The method of claim 43, wherein said indexing operator comprises a set of square brackets ([ ]).

45. An apparatus comprising:
a storage medium having stored therein a plurality of programming instructions, which when executed enables the apparatus to:
receive a mapping definition mapping selected elements of an XML data structure to selected objects of one or more Java classes,
determine whether the mapping definition comprises one or more definitional statements expressed with language elements of a script language,
determine whether the one or more definitional statements comprise an expression including an indexing operator defining a left operand and an index value, if the mapping definition comprises one or more definitional statements expressed with language elements of a script language, and
process the expression to access a single element of the XML data structure having an ordinal position equivalent to the index value; and
one or more processors coupled to the storage medium to execute the programming instructions.

46. The apparatus of claim 45, wherein said indexing operator comprises a set of square brackets ([ ]).

47. A method comprising:
receiving a mapping definition mapping selected elements of an XML data structure to selected objects of one or more Java classes;
determining whether the mapping definition comprises a mapping definition section having one or more definitional statements expressed with XML oriented language elements of a script language that includes XML oriented language elements; and
processing the mapping definition, including processing the mapping definition having mapping definition statements comprising XML oriented language elements of said script language in accordance with syntactical and semantic definitions of said XML oriented language elements.

48. An apparatus comprising:
a storage medium having stored therein a plurality of programming instructions, which when executed enables the apparatus to:
receive a mapping definition mapping selected elements of an XML data structure to selected objects of one or more Java classes,
determine whether the mapping definition comprises a mapping definition section having one or more definitional statements expressed with XML oriented language elements of a script language that includes XML oriented language elements, and process the mapping definition, including processing the mapping definition having mapping definition statements comprising XML oriented language elements of said script language in accordance with syntactical and semantic definitions of said XML oriented language elements; and one or more processors coupled to the storage medium to execute the programming instructions.

49. A method comprising:

receiving a mapping definition mapping selected elements of an XML data structure to selected objects of one or more Java classes;

determining whether the mapping definition comprises one or more definitional statements expressed with language elements of a script language;

determining whether the one or more definitional statements comprises an expression comprising a literal value having a predefined unary operator, if the mapping definition comprises one or more definitional statements expressed with language elements of a script language; and processing the expression as an XML object, if it is determined that the one or more definitional statements comprises an expression comprising a literal value having the predefined unary operator.

50. The method of claim 49, wherein the unary operator is represented by the "<" symbol.

51. A method comprising:

receiving a mapping definition mapping selected elements of an XML data structure to selected objects of one or more Java classes;

determining whether the mapping definition comprises one or more definitional statements expressed with language elements of a script language;

determining whether the one or more definitional statements comprises an expression comprising an iterative operator, if the mapping definition comprises one or more definitional statements expressed with language elements of a script language; and processing the expression as an XML object to iteratively access a list of one or more elements identified by the iterative operator, if it is determined that the one or more definitional statements comprises an expression comprising an iterative operator.

* * * * *